(12) United States Patent
Choi et al.

(10) Patent No.: US 9,195,049 B2
(45) Date of Patent: Nov. 24, 2015

(54) LIGHT REFRACTION CONTROLLING PANEL, 3D-DISPLAY COMPRISING THE SAME, AND METHOD OF OPERATING THE 3D-DISPLAY

(75) Inventors: Kyu-hwan Choi, Yongin-si (KR); Jung-mok Bae, Seoul (KR); Hoon Song, Yongin-si (KR); Sang-yoon Lee, Seoul (KR); Yoon-sun Choi, Yongin-si (KR); Eok-su Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 542 days.

(21) Appl. No.: 13/554,443

(22) Filed: Jul. 20, 2012

(65) Prior Publication Data

US 2013/0021388 A1    Jan. 24, 2013

(30) Foreign Application Priority Data

Jul. 22, 2011    (KR) .......................... 10-2011-0073038

(51) Int. Cl.
| | |
|---|---|
| *G02B 26/00* | (2006.01) |
| *G02B 1/06* | (2006.01) |
| *G02B 5/06* | (2006.01) |
| *G02B 27/22* | (2006.01) |
| *H04N 13/04* | (2006.01) |
| *G09G 3/00* | (2006.01) |
| *G09G 3/34* | (2006.01) |
| *G09G 3/38* | (2006.01) |

(52) U.S. Cl.
CPC ............... *G02B 26/005* (2013.01); *G02B 5/06* (2013.01); *G02B 27/2214* (2013.01); *G09G 3/003* (2013.01); *H04N 13/0418* (2013.01); *G09G 3/3406* (2013.01); *G09G 3/38* (2013.01)

(58) Field of Classification Search
CPC .................................. G02B 3/14; G02B 26/004
See application file for complete search history.

(56) References Cited

U.S. PATENT DOCUMENTS

| | | | |
|---|---|---|---|
| 6,917,456 B2 * | 7/2005 | Reboa et al. ................... | 359/253 |
| 7,515,340 B1 | 4/2009 | Shiu et al. | |
| 8,873,004 B2 * | 10/2014 | Bae et al. ....................... | 349/112 |
| 2008/0198292 A1 | 8/2008 | Marra et al. | |
| 2008/0316302 A1 | 12/2008 | Vos et al. | |
| 2009/0257111 A1 * | 10/2009 | Heikenfeld et al. .......... | 359/295 |
| 2014/0126038 A1 * | 5/2014 | Choi et al. ..................... | 359/290 |

FOREIGN PATENT DOCUMENTS

| | | |
|---|---|---|
| KR | 10-2005-0085243 A | 8/2005 |
| KR | 10-0818281 B1 | 4/2008 |
| WO | WO 2005/096069 A1 | 10/2005 |
| WO | WO 2009/050273 A2 | 4/2009 |

* cited by examiner

*Primary Examiner* — Tuyen Tra
(74) *Attorney, Agent, or Firm* — NSIP Law

(57) ABSTRACT

A light refraction controlling panel, a 3D-display, and a method of operating a 3D-display are provided. The light refraction controlling panel includes a transparent substrate, a barrier wall on the transparent substrate, first to fourth electrodes on the barrier wall, the first to fourth electrodes being separated from each other, an electro-wetting prism within the barrier wall, the electro-wetting prism being configured to refract incident light to a desired direction, and an isolation layer between the barrier wall and the first to fourth electrodes, and the electro-wetting prism. One electrode of two adjacent electrodes of the first to fourth electrodes is inside an other electrode of the two adjacent electrodes.

15 Claims, 7 Drawing Sheets

FIG. 6A
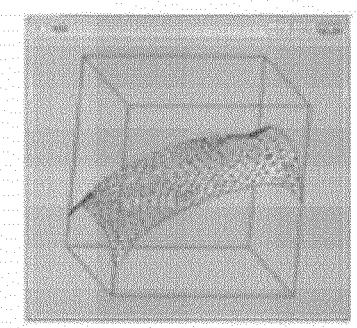
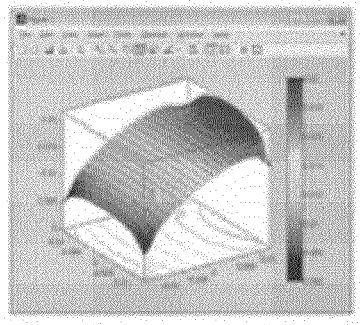
FIG. 6B
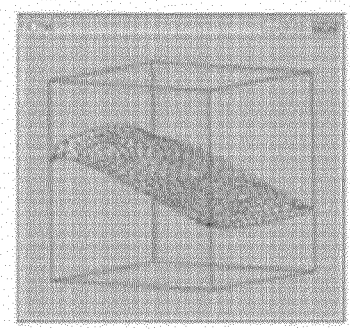
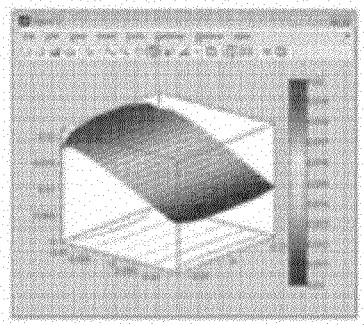

LIGHT REFRACTION CONTROLLING PANEL, 3D-DISPLAY COMPRISING THE SAME, AND METHOD OF OPERATING THE 3D-DISPLAY

CROSS-REFERENCE TO RELATED APPLICATIONS

This application claims the benefit under 35 U.S.C. §119 (a) of Korean Patent Application No. 10-2011-0073038, filed on Jul. 22, 2011, in the Korean Intellectual Property Office, the entire disclosure of which is incorporated herein by reference for all purposes.

BACKGROUND

1. Field

The following description relates to a display device, and, for example, to a light refraction controlling panel, a 3D-display including the same, and a method of operating the 3D-display.

2. Description of Related Art 3D-displays may be classified according to how 3D images are displayed, points at which 3D images are being viewed, conditions under which the 3D images are being viewed, and whether glasses are required to view the 3D images. In general, binocular parallax is implemented to allow a user to recognize a 3D image provided by a display. If an image observed at different angles is provided to both eyes, the brain of the user perceives depth in the viewing of the image.

Methods of 3D-image display may be classified into stereoscopic display methods and volumetric display methods. According to stereoscopic display methods, a user is able to recognize an entire 3D image through viewing two 2D images having binocular parallax provided to both of the user's eyes. Thus, stereoscopic display methods provide a 3D image that may only be observed by the user in one direction. According to volumetric display methods, images of an object are displayed in various directions. Thus, volumetric display methods provide a 3D image that may be recognized by the user in multiple directions.

A multi-view display method, one of the 3D image display techniques, displays binocular parallax images obtained in various directions. The multi-view display method may include a parallax panoramagram method, a lenticular method, an integral photography (IP) or volumetric-graph method, and a slit scan method.

The IP method may allow a user to view a 3D image at a desired position without observation glasses. A display providing a 3D image to a user according to the IP method includes a micro lens array or a pin hole array. The IP method is widely applied to medical and engineering simulations.

SUMMARY

In one general aspect, there is provided a light refraction controlling panel, including a transparent substrate, a barrier wall on the transparent substrate, first to fourth electrodes on the barrier wall, the first to fourth electrodes being separated from each other, an electro-wetting prism within the barrier wall, the electro-wetting prism being configured to refract incident light to a desired direction, and an isolation layer between the barrier wall and the first to fourth electrodes, and the electro-wetting prism. One electrode of two adjacent electrodes of the first to fourth electrodes is inside an other electrode of the two adjacent electrodes.

A general aspect of the light refraction controlling panel may provide that the two adjacent electrodes are perpendicular to each other and partially overlap each other.

A general aspect of the light refraction controlling panel may provide an upper electrode on the isolation layer, and a glass substrate on the upper electrode. The electro-wetting prism is partially filled between the upper electrode and the isolation layer.

A general aspect of the light refraction controlling panel may provide that the isolation layer includes an insulating layer, and a coating layer on the insulating layer.

A general aspect of the light refraction controlling panel may provide that the barrier wall includes a double organic barrier wall.

A general aspect of the light refraction controlling panel may provide that the one electrode of the two adjacent electrodes is between the other electrode of the two adjacent electrodes and an electrode of the first to fourth electrodes that is parallel to the other electrode of the two adjacent electrodes.

A general aspect of the light refraction controlling panel may provide that the double organic barrier wall comprises a first and a second organic barrier wall, two electrodes of the first to fourth electrodes are on the first organic barrier wall, and an other two electrodes of the first to fourth electrodes are on the second organic barrier wall.

A general aspect of the light refraction controlling panel may provide that the other electrode of the two adjacent electrodes and the electrode of the first to fourth electrodes that is parallel to the other electrode of the two adjacent electrodes have ends that are bent.

A general aspect of the light refraction controlling panel may provide that the bent ends face each other.

A general aspect of the light refraction controlling panel may provide that the barrier wall includes a double organic barrier wall, and a portion of the bent ends of the other electrode of the two adjacent electrodes and the electrode of the first to fourth electrodes that is parallel to the other electrode of the two adjacent electrodes is between a first and a second organic barrier wall of the double organic barrier wall.

In another general aspect, there is provided a 3D-display, including a backlight unit, a liquid crystal panel on the backlight unit, an optical panel on the backlight unit, and a light refraction controlling panel on the backlight unit, the light refraction controlling panel being configured to refract light incident from the backlight unit to a desired direction, the light refraction controlling panel including a transparent substrate, a barrier wall on the transparent substrate, first to fourth electrodes on the barrier wall, the first to fourth electrodes being separated from each other, an electro-wetting prism within the barrier wall, the electro-wetting prism being configured to refract the light to the desired direction, and an isolation layer between the barrier wall and the first to fourth electrodes, and the electro-wetting prism. One electrode of two adjacent electrodes of the first to fourth electrodes is inside an other electrode of the two adjacent electrodes.

A general aspect of the 3D-display may provide that the liquid crystal panel includes two liquid crystal panels spaced apart from each other and the backlight unit.

A general aspect of the 3D-display may provide that the light refraction controlling panel is between one of the two liquid crystal panels that is located closest to the backlight unit and one of the backlight unit, and the optical panel.

A general aspect of the 3D-display may provide that the light refraction controlling panel is in front of or behind one of the two liquid crystal panels that is located closest to the backlight unit.

In yet another general aspect, there is provided a method of operating a 3D-display, the 3D-display including a backlight unit, a liquid crystal panel on the backlight unit, an optical panel on the backlight unit, and a light refraction controlling panel on the backlight unit, the light refraction controlling panel being configured to refract light incident from the backlight unit to a desired direction, the light refraction controlling panel including a transparent substrate, a barrier wall on the transparent substrate, first to fourth electrodes on the barrier wall, the first to fourth electrodes being separated from each other, an electro-wetting prism within the barrier wall, the electro-wetting prism being configured to refract the light to the desired direction, and an isolation layer between the barrier wall and the first to fourth electrodes, and the electro-wetting prism, the method including respectively applying voltages to first to fourth electrodes to control an inclination angle of a prism interface of the electro-wetting prism. One electrode of two adjacent electrodes of the first to fourth electrodes is inside an other electrode of the two adjacent electrodes.

A general aspect of the method may provide that a voltage applied to one electrode of the first to fourth electrodes is equal to a voltage applied to an electrode of the first to fourth electrodes that faces the one electrode, and a voltage applied to an other electrode of the first to fourth electrodes is different from a voltage applied to an electrode of the first to fourth electrodes that faces the other electrode.

Other features and aspects may be apparent from the following detailed description, the drawings, and the claims.

BRIEF DESCRIPTION OF THE DRAWINGS

FIGS. 6A-6C show graphs respectively illustrating examples of simulation results of inclination angles of prism interfaces when the alignment of electrodes of a unit cell of a light refraction controlling panel is as shown in FIG. 7, as shown in FIG. 2, and as shown in FIG. 4.

Figure 1:
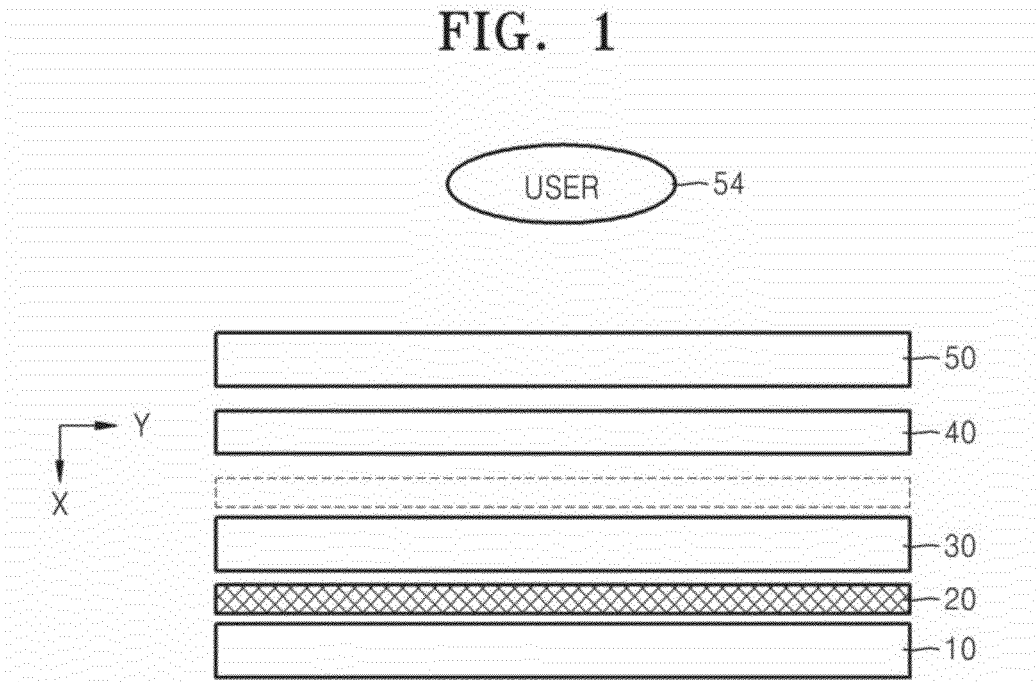
FIG. 1 is a plan view schematically illustrating a structure of a three-dimensional (3D) display according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. In addition, descriptions of well-known functions and constructions may be omitted for increased clarity and conciseness.

It is understood that the features of the present disclosure may be embodied in different forms and should not be constructed as limited to the example embodiment(s) set forth herein. Rather, embodiment(s) are provided so that this disclosure will be thorough and complete, and will convey the full scope of the present disclosure to those skilled in the art. The drawings may not be necessarily to scale, and, in some instances, proportions may have been exaggerated in order to clearly illustrate features of the embodiment(s). When a first layer is referred to as being "on" a second layer or "on" a substrate, it may not only refer to a case where the first layer is formed directly on the second layer or the substrate but may also refer to a case where a third layer exists between the first layer and the second layer or the substrate.

Hereinafter, a light refraction controlling panel according to an example embodiment, a 3D-display including the same, and a method of operating the 3D-display will be described in detail with reference to the accompanying drawings. In the accompanying drawings, thicknesses and sizes of layers or regions are exaggerated for clarity.

First, a 3D-display according to an example embodiment will be described. In this regard, a light refraction controlling panel and a method of operating the 3D-display will also be described.

FIG. 1 is a plan view schematically illustrating a structure of a 3D-display according to an example embodiment.

Referring to FIG. 1, the 3D-display includes a backlight unit 10, a light refraction controlling panel 20, a first liquid crystal panel 30, an optical panel 40, and a second liquid crystal panel 50. These components are sequentially aligned. For example, the backlight unit 10 may be a cold cathode fluorescent lamp (CCFL) or a light-emitting diode (LED) unit. The light refraction controlling panel 20 controls a refraction angle of light that is incident from the backlight unit 10 and emitted from the light refraction controlling panel 20. For example, the light refraction controlling panel 20 may be an electro-wetting optical prism panel. The optical panel 40 may include lenses, for example, Fresnel lenses, lenticular lens, or the like. The first liquid crystal panel 30 may be a light source for a 2D or 3D image. The second liquid crystal panel 50 may be a screen on which an image viewed by a user 54 is displayed. The light refraction controlling panel 20 may be disposed between the first liquid crystal panel 30 and the optical panel 40 as shown by the dashed line in FIG. 1.

Figure 2:
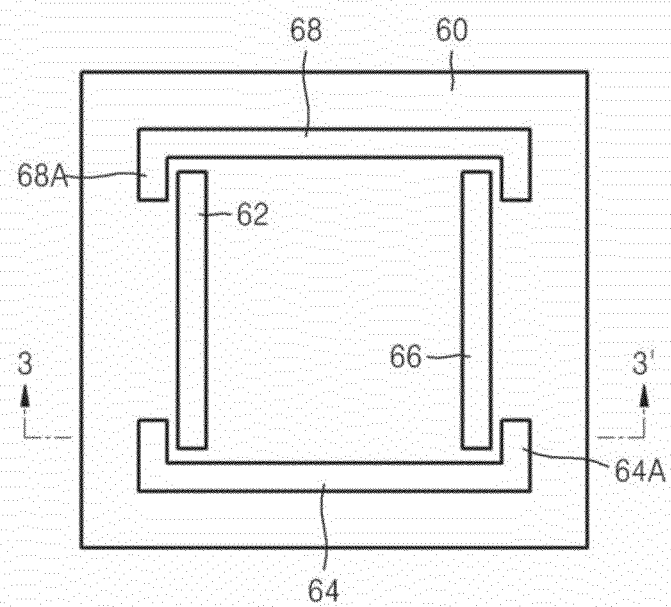
FIG. 2 is a front view illustrating an example of a light refraction controlling panel of FIG. 1 viewed in an x direction that shows an alignment of electrodes of a unit cell.

FIG. 2 shows a unit cell of the light refraction controlling panel 20 of FIG. 1. The unit cell of FIG. 2 is viewed in an x direction of FIG. 1.

Referring to FIG. 2, the unit cell includes first, second, third, and fourth electrodes 62, 64, 66, 68. The first and third electrodes 62, 66 are spaced apart from each other in parallel. The second and fourth electrodes 64, 68 are disposed perpendicular to the first and third electrodes 62, 66. The second and fourth electrodes 64, 68 are spaced apart from each other in parallel. The first and third electrodes 62, 66 are disposed between the second and fourth electrodes 64, 68. The second electrode 64 has bent first portions 64A at both ends. The fourth electrode 68 has bent second portions 68A at both ends. The first and second portions 64A, 68A are bent toward the inside of the unit cell and face each other. The first portions 64A of the second electrode 64 respectively overlap with one end of each of the first and third electrodes 62, 66.

The second portions 68A of the fourth electrode 68 respectively overlap with the other end of each of the first and third electrodes 62, 66. The space surrounded by the first, second, third, and fourth electrodes 62, 64, 66, 68 is filled with liquid material layers that form a refractive interface, for example, water and oil, which are not shown herein. A glass substrate 60 covers the first, second, third, and fourth electrodes 62, 64, 66, 68.

Figure 3:
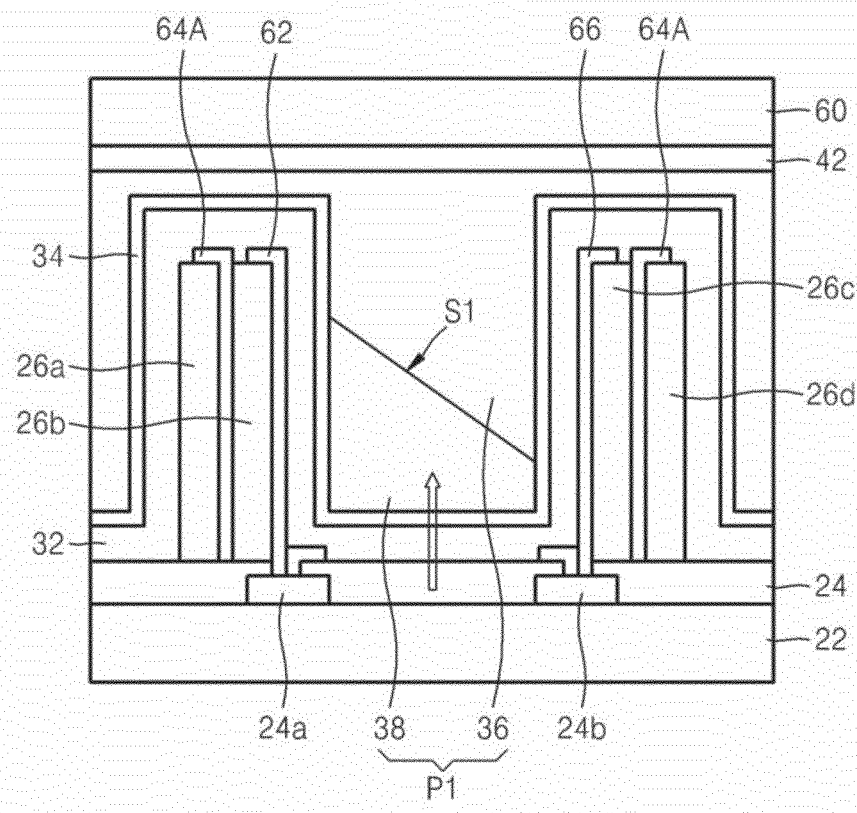
FIG. 3 shows a cross-sectional view illustrating an example of the unit cell of FIG. 2 taken along line 3-3'.

FIG. 3 shows a cross-sectional view of the unit cell of FIG. 2 taken along line 3-3'.

Referring to FIG. 3, first and second wirings 24a, 24b are disposed on a transparent substrate 22. The first and second wirings 24a, 24b may be lower electrodes. An interlayer insulating layer 24 is formed on the transparent substrate 22 to cover the first and second wirings 24a, 24b. The interlayer insulating layer 24 may be a transparent insulating layer, for example, a silicon oxide layer. First to fourth organic barrier walls 26a to 26d are disposed on the interlayer insulating layer 24. The first and second organic barrier walls 26a, 26b and the third and fourth organic barrier walls 26c, 26d are spaced apart from each other. In an example, a double organic wall is formed by the first and second organic barrier walls 26a and 26b. In another example, a double organic wall is formed by the third and fourth organic barrier walls 26c and 26d. An electro-wetting prism P1 is disposed between the first and second organic barrier walls 26a, 26b and the third and fourth organic barrier walls 26c, 26d. An inclination angle of a prism interface S1 of the electro-wetting prism P1 may vary according to voltages applied to the first, second, third, and fourth electrodes 62, 64, 66, 68. Thus, a refractive direction of light incident from the backlight unit 10 as shown with an arrow may be adjusted by controlling the voltages applied to the first, second, third, and fourth voltages 62, 64, 66, 68. As a result, the direction of light emitted from the light refraction controlling panel 20 may be controlled.

The electro-wetting prism P1 includes a first material 38 having a relatively high refractive index and a second material 36 having a lower refractive index than the first material 38. The incident light as shown with the arrow sequentially passes the first material 38 and the second material 36. For example, the first material 38 may be oil. For example, the second material 36 may be water. A bent portion of the second electrode 64, i.e., the first portion 64A, is disposed between the first and second organic barrier walls 26a, 26b. The first portion 64A extends to the upper surface of the first organic barrier wall 26a and faces outside of the unit cell. The first electrode 62 is disposed at an inner side of the second organic barrier wall 26b. The first electrode 62 extends to the upper surface of the second organic barrier wall 26b and faces outside of the unit cell. However, the first electrode 62 does not contact the first portion 64A. The first electrode 62 is connected to the first wiring 24a. A voltage may be applied to the first electrode 62 via the first wiring 24a in order to control the inclination angle of the prism interface S1.

The first portion 64A is disposed between the third and fourth organic barrier walls 26c, 26d. The first portion 64A extends to the upper surface of the fourth organic barrier wall 26d and faces outside of the unit cell. An inner side of the third organic barrier wall 26c is covered with the third electrode 66. The third electrode 66 extends to the upper surface of the third organic barrier wall 26c, faces outside of the unit cell, and is spaced apart from the first portion 64A. The third electrode 66 is connected to the second wiring 24b. Thus, a voltage may be applied to the third electrode 66 via the second wiring 24b in order to control the inclination angle of the prism interface S1. Although not shown in FIG. 3, the second and fourth electrodes 64, 68 are also connected to a wiring used to apply a voltage to control the inclination angle of the prism interface S1.

An insulating layer 32 and a coating layer 34 are sequentially stacked between the electro-wetting prism P1 and the first to fourth organic barrier walls 26a to 26d, the first portion 64A, the first electrode 62, and the third electrode 66. The coating layer 34 may be a hydrophobic material layer. The insulating layer 32 and the coating layer 34 cover the first to fourth organic barrier walls 26a to 26d, the first portion 64A, the first electrode 62, and the third electrode 66. The insulating layer 32 and the coating layer 34 may be an isolation layer that isolates the first to fourth organic barrier walls 26a to 26d, the first portion 64A, the first electrode 62, and the third electrode 66 from the electro-wetting prism P1. An upper electrode 42 and the glass substrate 60 are sequentially disposed on the coating layer 34. The space between the coating layer 34 and the upper electrode 42 is filled with the second material 36. The second material 36 is also filled between the unit cells.

As described above, the light refraction controlling panel 20 according to the current embodiment controls the direction of light using the electro-wetting prism P1. Thus, light efficiency of a device including the light refraction controlling panel 20 may be increased compared to using a polarized light. In addition, since a uniform driving voltage may be applied regardless of a gap between unit cells, the light refraction controlling panel may be applied to micro pixels and may be operated at a high speed.

Figure 4:
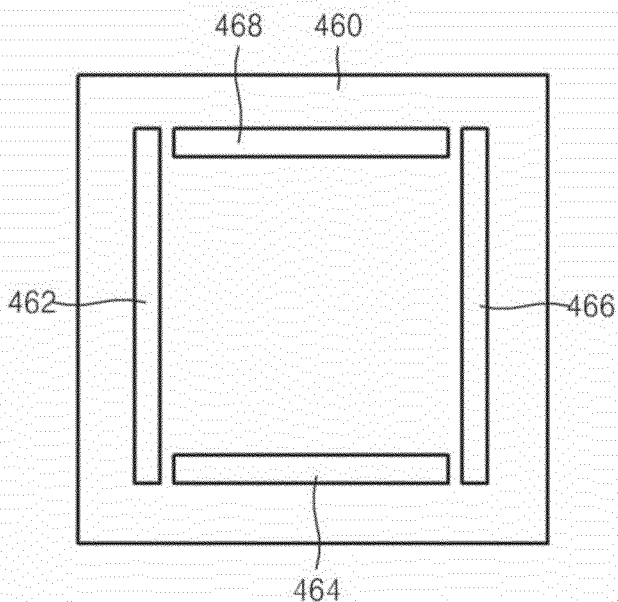
FIGS. 4 and 5 illustrates examples of modifications of the alignment of electrodes of a unit cell of the light refraction controlling panel of FIG. 1.

FIG. 4 is a modification of the unit cell of FIG. 2.

Referring to FIG. 4, second and fourth electrodes 464, 468 do not have bent portions. In FIG. 4, the second and fourth electrodes 464, 468 are spaced apart from each other in parallel and disposed between first and third electrodes 462, 466. The second electrode 464 is disposed between one end of each of the first and third electrodes 462, 466 within a virtual boundary line (not shown) connecting the one end of each of the first and third electrodes 462, 466. The second electrode 464 is spaced apart from one end of each of the first and third electrodes 462, 466. The fourth electrode 468 is disposed between the other end of each of the first and third electrodes 462, 466 within a virtual boundary line (not shown) connecting the other end of each of the first and third electrodes 462, 466.

Figure 5:
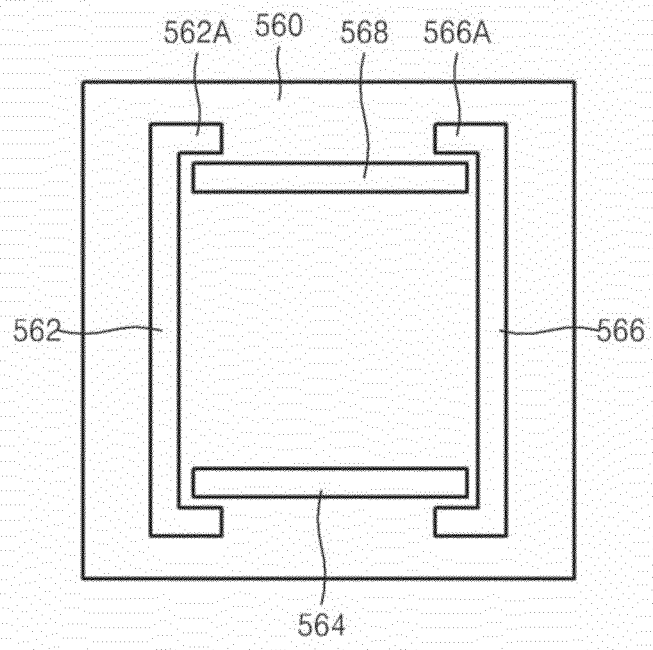

FIG. 5 is another modification of the unit cell of FIG. 2.

Referring to FIG. 5, second and fourth electrodes 564, 568 are disposed paced apart from each other in parallel between the first and third electrodes 562, 566. The first electrode 562 has bent third portions 562A at both ends. The third electrode 566 is spaced apart from the first electrode 562 in parallel and has bent fourth portions 566A at both ends. The third and fourth portions 562A, 566A face each other. The third and fourth portions 562A, 566A extend to outside of the second and fourth electrodes 564, 568. Accordingly, the third portion 562A overlaps with one end of each of the second and fourth electrodes 564, 568, and the fourth portion 566A overlaps with the other end of each of the second and fourth electrodes 564, 568. The third and fourth portions 562A, 566A are not in contact with the electrodes 564, 568.

As such, the alignment of the first, second, third, and fourth electrodes may vary, as is shown in the unit cells of FIGS. 2, 4, and 5. The arrangement of the first, second, third, and fourth electrodes may be modified in various manners to block or reduce an electrical field generated from one of the electrodes adjacent to others at edges of the first, second, third, and fourth electrodes.

Figure 6C:
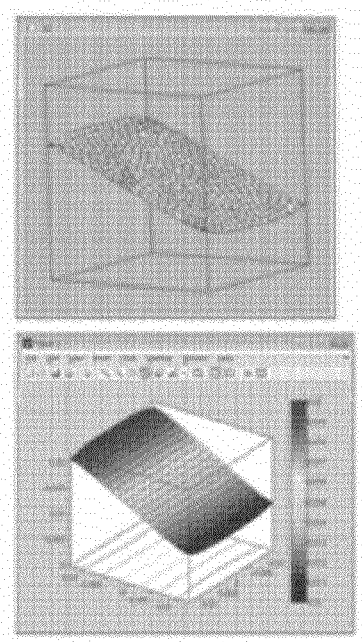
Figure 7:
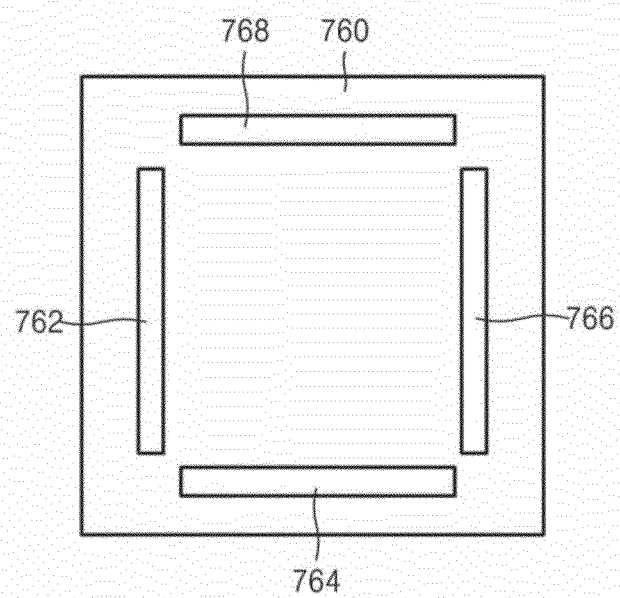
FIG. 7 is a front view illustrating an example of a general alignment of electrodes of a unit cell.

FIG. 6 shows graphs illustrating examples of simulation results of prism interfaces when the arrangement of the first, second, third, and fourth electrodes 762, 764, 766, 768 is as shown in FIG. 7 (left), the first, second, third, and fourth electrodes 62, 64, 66, 68 as shown in FIG. 2 (right), and the first, second, third, and fourth electrodes 462, 464, 466, 468 as shown in FIG. 4 (center).

These simulation results were obtained by applying a voltage, for example, 3.9 V, 9.5 V, 12.9 V and 9.5 V, to each of the first, second, third, and fourth electrodes. The contact angle of the prism interface with respect to each of the electrodes varies according to the voltage applied to the electrode. The applied voltage and the changed contact angle may be calculated using the Lipmann-Young equation.

In the simulation results, a dimensional size of the edges of the first, second, third, and fourth electrodes was 10 μm. In addition, the size of the unit cell was, for example, 254 μm.

In FIG. 6, the inclination angle of the left prism interface is 23°, the inclination angle of the central prism interface is 26°, and the inclination angle of the right prism interface is 28°. As shown in the right prism interface, as the inclination angle is close to 30°, the direction of refracted light may be adjusted and image information having at least two view points may be provided to a user. Thus, this may also be applied to a super multi-view system.

In addition, comparing the three prism interfaces of FIG. 6, the overall surface of the right prism interface is flatter than that of the left prism interface, and the electrodes of the right prism interface are less bent at the edges thereof compared to those of the left prism interface in the dimension. The surface of the right prism interface is flatter than that of the central prism interface, and the edges of the electrodes of the right prism interface are not bent. Referring to FIG. 6, the prism interface according to the example embodiment is more stable and uniform and has a greater inclination angle compared to general prism interfaces. Thus, the 3D-display according to the example embodiment may reduce fatigue.

Figure 8:
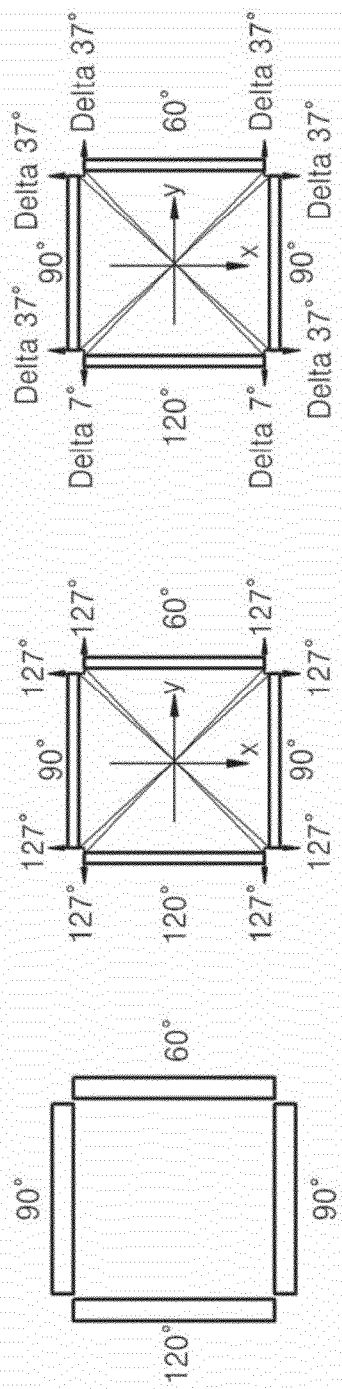
FIGS. 8 to 10 are front views respectively illustrating examples of contact angle changes in a dimension between electrodes of a unit cell of a light refraction controlling panel and contact angle difference between the electrodes when the alignment of the electrodes is as shown in FIG. 7, as shown in FIG. 2, and as shown in FIG. 4.

FIG. 8 shows a contact angle of an electro-wetting prism and contact angle difference between first, second, third, and fourth electrodes 762, 764, 766, 768 according to a voltage applied to the first, second, third, and fourth electrodes 762, 764, 766, 768 when the first, second, third, and fourth electrodes 762, 764, 766, 768 of a unit cell are aligned as shown in FIG. 7 according to a general alignment.

Figure 9:
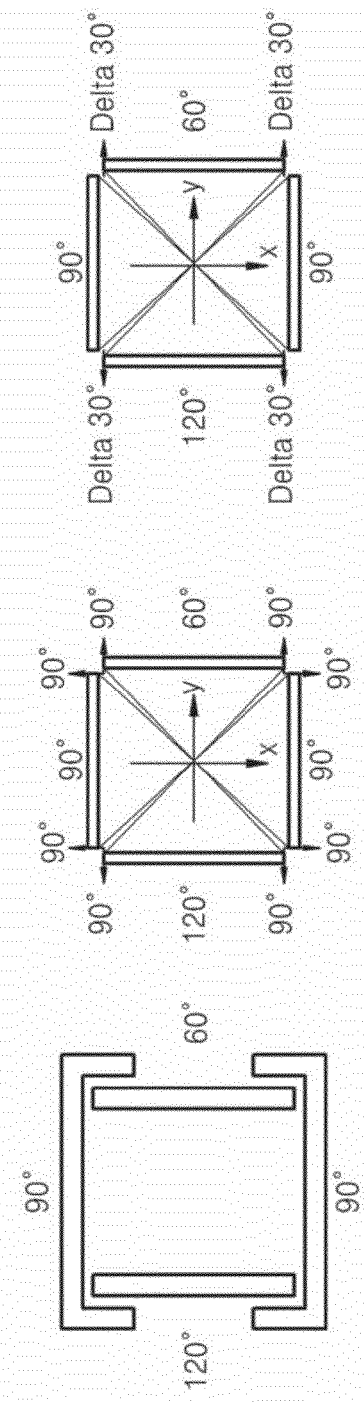

FIG. 9 shows a contact angle of an electro-wetting prism and contact angle difference between first, second, third, and fourth electrodes 62, 64, 66, 68 according to a voltage applied to the first, second, third, and fourth electrodes 62, 64, 66, 68 when the first, second, third, and fourth electrodes 62, 64, 66, 68 of a unit cell are aligned as shown in FIG. 2 according to an example embodiment.

Figure 10:
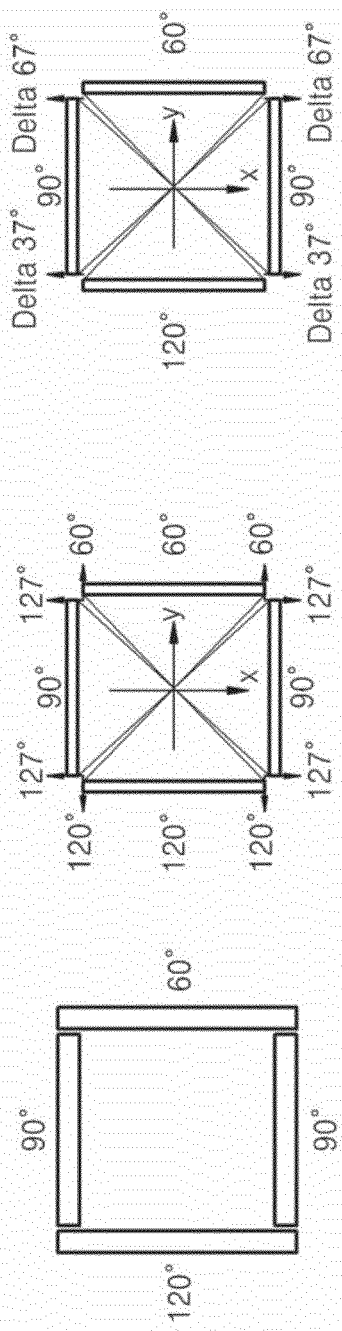

FIG. 10 shows a contact angle of an electro-wetting prism and contact angle difference between first, second, third, and fourth electrodes 462, 464, 466, 468 according to a voltage applied to the first, second, third, and fourth electrodes 462, 464, 466, 468 when the first, second, third, and fourth electrodes 462, 464, 466, 468 of a unit cell are aligned as shown in FIG. 4 according to an example embodiment. Voltages applied to the first, second, third, and fourth electrodes shown in FIGS. 8 to 10 are as described with reference to FIG. 6.

Comparing FIGS. 8 to 10, contact angles of the electro-wetting prism interface with respect to the first, second, third, and fourth electrodes are respectively 120°, 90°, 60°, and 90°. However, an initial contact angle is 127° in a dimension region between the electrodes in FIG. 8. On the other hand, the initial contact angle is 90° in FIG. 9, and the initial contact angles are 120° and 127° or 127° and 60° in FIG. 10. Thus, the initial contact angle of FIGS. 9 and 10 is less than that of FIG. 8 in the dimension region. In addition, if a difference between an initial contact angle in a dimension region between electrodes and a contact angle with adjacent electrodes is defined as a delta value, the delta value is 7° to 67° in FIG. 8. On the other hand, a delta value of FIG. 9 is constantly 30°, and delta values of FIG. 10 are 37° and 67°. As such, the initial contact angles in the dimension region of FIGS. 9 and 10 are less than that of FIG. 8. In addition, the delta values of FIGS. 9 and 10 are less than that of FIG. 8.

Based on these results, a portion of the prism interface of the electro-wetting prisms shown in FIGS. 9 and 10 corresponding to the dimension region is less bent compared to that of FIG. 8.

As a result, when the unit cells shown in FIGS. 9 and 10 have the alignment of the electrodes as shown in FIGS. 2, 4, and 5, the prism interfaces of the electro-wetting prisms have flatter and greater inclination angles.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A light refraction controlling panel, comprising:
a transparent substrate;
a barrier wall on the transparent substrate; first to fourth electrodes on the barrier wall, the first to fourth electrodes being separated from each other;
an electro-wetting prism within the barrier wall, the electro-wetting prism being configured to refract incident light to a desired direction; and
an isolation layer between the barrier wall and the first to fourth electrodes, and the electro-wetting prism,
wherein one electrode of two adjacent electrodes of the first to fourth electrodes is inside an other electrode of the two adjacent electrodes,
wherein the two adjacent electrodes are perpendicular to each other and partially overlap each other.

2. The light refraction controlling panel of claim 1, further comprising:
an upper electrode on the isolation layer; and
a glass substrate on the upper electrode,
wherein the electro-wetting prism is partially filled between the upper electrode and the isolation layer.

3. The light refraction controlling panel of claim 1, wherein the isolation layer comprises an insulating layer and a coating layer on the insulating layer.

4. The light refraction controlling panel of claim 1, wherein the barrier wall comprises a double organic barrier wall.

5. The light refraction controlling panel of claim 4, wherein the double organic barrier wall comprises a first and a second organic barrier wall,
wherein two electrodes of the first to fourth electrodes are on the first organic barrier wall, and
wherein an other two electrodes of the first to fourth electrodes are on the second organic barrier wall.

6. The light refraction controlling panel of claim 1, wherein the one electrode of the two adjacent electrodes is between the other electrode of the two adjacent electrodes and an electrode of the first to fourth electrodes that is parallel to the other electrode of the two adjacent electrodes.

7. The light refraction controlling panel of claim 6, wherein the other electrode of the two adjacent electrodes and the electrode of the first to fourth electrodes that is parallel to the other electrode of the two adjacent electrodes have ends that are bent.

8. The light refraction controlling panel of claim 7, wherein the bent ends face each other.

9. The light refraction controlling panel of claim 7, wherein the barrier wall comprises a double organic barrier wall, and
wherein a portion of the bent ends of the other electrode of the two adjacent electrodes and the electrode of the first to fourth electrodes that is parallel to the other electrode of the two adjacent electrodes is between a first and a second organic barrier wall of the double organic barrier wall.

10. A 3D-display, comprising:
a backlight unit;
a liquid crystal panel on the backlight unit;
an optical panel on the backlight unit; and
a light refraction controlling panel on the backlight unit, the light refraction controlling panel being configured to refract light incident from the backlight unit to a desired direction, the light refraction controlling panel comprising a transparent substrate, a barrier wall on the transparent substrate, first to fourth electrodes on the barrier wall, the first to fourth electrodes being separated from each other, an electro-wetting prism within the barrier wall, the electro-wetting prism being configured to refract the light to the desired direction, and an isolation layer between the barrier wall and the first to fourth electrodes, and the electro-wetting prism, wherein one electrode of two adjacent electrodes of the first to fourth electrodes is inside an other electrode of the two adjacent electrodes,
wherein the two adjacent electrodes are perpendicular to each other and partially overlap each other.

11. The 3D-display of claim 10, wherein the liquid crystal panel comprises two liquid crystal panels spaced apart from each other and the backlight unit.

12. The 3D-display of claim 11, wherein the light refraction controlling panel is between one of the two liquid crystal panels that is located closest to the backlight unit and one of the backlight unit, and the optical panel.

13. The 3D-display of claim 11, wherein the light refraction controlling panel is in front of or behind one of the two liquid crystal panels that is located closest to the backlight unit.

14. A method of operating a 3D-display, the 3D-display including a backlight unit, a liquid crystal panel on the backlight unit, an optical panel on the backlight unit, and a light refraction controlling panel on the backlight unit, the light refraction controlling panel being configured to refract light incident from the backlight unit to a desired direction, the light refraction controlling panel including a transparent substrate, a barrier wall on the transparent substrate, first to fourth electrodes on the barrier wall, the first to fourth electrodes being separated from each other, an electro-wetting prism within the barrier wall, the electro-wetting prism being configured to refract the light to the desired direction, and an isolation layer between the barrier wall and the first to fourth electrodes, and the electro-wetting prism, the method comprising:
respectively applying voltages to first to fourth electrodes to control an inclination angle of a prism interface of the electro-wetting prism,
wherein one electrode of two adjacent electrodes of the first to fourth electrodes is inside an other electrode of the two adjacent electrodes,
wherein the two adjacent electrodes are perpendicular to each other and partially overlap each other.

15. The method of claim 14, wherein a voltage applied to one electrode of the first to fourth electrodes is equal to a voltage applied to an electrode of the first to fourth electrodes that faces the one electrode, and
wherein a voltage applied to an other electrode of the first to fourth electrodes is different from a voltage applied to an electrode of the first to fourth electrodes that faces the other electrode.

* * * * *